United States Patent
Cote

(10) Patent No.: US 9,545,080 B1
(45) Date of Patent: Jan. 17, 2017

(54) SQUIRREL FEEDER

(71) Applicant: PLC Patents and Trade Marks Inc., La Brome (CA)

(72) Inventor: Paul L. Cote, Lac Brome (CA)

(*) Notice: Subject to any disclaimer, the term of this patent is extended or adjusted under 35 U.S.C. 154(b) by 41 days.

(21) Appl. No.: 14/545,929

(22) Filed: Jul. 9, 2015

(51) Int. Cl.
*A01K 5/00* (2006.01)

(52) U.S. Cl.
CPC ..................................... *A01K 5/00* (2013.01)

(58) Field of Classification Search
CPC ..... A01K 5/0114; A01K 39/0106; A01K 5/00
USPC .................. 119/51.03, 708, 707, 51.01, 52.3
See application file for complete search history.

(56) References Cited

U.S. PATENT DOCUMENTS

| | | | | |
|---|---|---|---|---|
| 1,550,438 A * | 8/1925 | Hohmann | .......... | A01K 39/0106 119/51.03 |
| 3,425,700 A * | 2/1969 | Edwards | ............ | A63B 69/0079 473/147 |
| 4,632,062 A * | 12/1986 | Hubbard | ............ | A01K 39/0106 119/51.03 |
| 4,940,018 A * | 7/1990 | Edling | ................. | A01K 15/025 119/708 |
| 5,111,771 A * | 5/1992 | Mathews | ............. | A01K 15/025 119/708 |
| 5,664,522 A * | 9/1997 | Keller | .................... | A01K 39/00 119/51.03 |
| 5,941,196 A * | 8/1999 | Domanski | ............ | A01K 15/025 119/708 |
| 6,085,692 A * | 7/2000 | Adams | ................. | A01K 5/0114 119/51.03 |
| 6,085,693 A * | 7/2000 | Guerrette | ............. | A01K 5/0114 119/51.03 |
| 6,360,694 B1 * | 3/2002 | Noto | .................... | A01K 15/025 119/707 |
| 6,474,260 B1 * | 11/2002 | Shultz | ...................... | A01K 5/00 119/51.03 |
| 6,575,119 B1 * | 6/2003 | Lonsway | ............. | A01K 15/025 119/707 |
| 8,640,653 B2 * | 2/2014 | Cook | .................... | A01K 15/025 119/707 |
| 8,893,655 B2 * | 11/2014 | Moore, Jr. | ........... | A01K 39/014 119/51.01 |
| 2007/0289550 A1 * | 12/2007 | Huang | ................. | A01K 15/025 119/707 |

* cited by examiner

*Primary Examiner* — Yvonne Abbott-Lewis
(74) *Attorney, Agent, or Firm* — Eric Fincham

(57) ABSTRACT

An apparatus comprising first and second arms which are pivotally connected together, the free ends of the arms being connected by a spring member, and a device for attracting squirrels at the end of a cable extending from one of the arms, the arrangement being such that the motion is imparted when a squirrel attempts to jump on the device.

6 Claims, 3 Drawing Sheets

US 9,545,080 B1

SQUIRREL FEEDER

FIELD OF THE INVENTION

The present invention relates generally to a feeding and amusement apparatus and more particularly, relates to an apparatus for the feeding of squirrels and the like.

BACKGROUND OF THE INVENTION

The feeding of birds is a well established practice, particularly in the areas wherein snow is present on the ground. The snow denies the bird access to seeds or other food which they would normally eat.

Squirrels present a problem for people trying to feed birds. Generally, they are regarded as a nuisance as they access the feeders and typically consume large amounts of feed which was intended for the birds. As a result, so-called squirrel proof bird feeders have been developed.

However, many people like to see the squirrels; they are known for their playfulness and agility. Accordingly, many people believe that the use of a squirrel feeder in conjunction with a bird feeder is desirable.

There are known feeders in the art for feeding squirrels. Typically, a prior art device will utilize a corn cob holder or the like.

It is also known in the art to provide a feeder wherein the squirrels antics are readily observable and provide a "show" for the observer. Thus, typically the food is angled such that a spinning or bouncing movement is imparted to the squirrel when he lands on the feed.

SUMMARY OF THE INVENTION

It is therefore an object of the present invention to provide for a squirrel feeder and toy.

According to one aspect of the present invention, there is provided an apparatus comprising a first arm having a first proximal end and a distal end, a second arm having a proximal end and a distal end, the distal end of the first arm being pivotally connected to the proximal end of the second arm, a spring member extending between the first and second arms, the spring member being attached to the first arm proximate the proximal end and attached to the second arm proximate the distal end, a hanger located at the proximal end of the first arm, and a play device, a flexible cable having a first end connected to the second arm proximate the distal end thereof and a second end of the cable being connected to the play device.

In this application, the term "play device" is utilized to signify a device which is placed at the end of a cable and which is designed to attract a squirrel or like animal. The play device may be a piece of food or a feed container.

The arms of the apparatus may be formed of any suitable material including, for example, plastic and/or metallic materials. Preferably, the material is chosen to be resistant to chewing by animals.

The spring member is typically a coil spring which will extend between the first and second arms. However, it will be understood that other spring arrangements may be utilized such as a spring mounted at the pivot point where the arms are connected.

Each of the arms preferably has a plurality of locations for connecting the spring. Thus, the tension of the spring can be adjusted depending upon the choice of apertures and the distance between the arms.

Due to the use of the arms with a spring connecting the same, when a squirrel will jump on the play unit, both a downward and sideward motion is imparted.

BRIEF DESCRIPTION OF THE DRAWINGS

Having thus generally described the invention, reference will be made to the accompanying drawings illustrating embodiments thereof, in which.

DETAILED DESCRIPTION OF THE INVENTION

Figure 1:
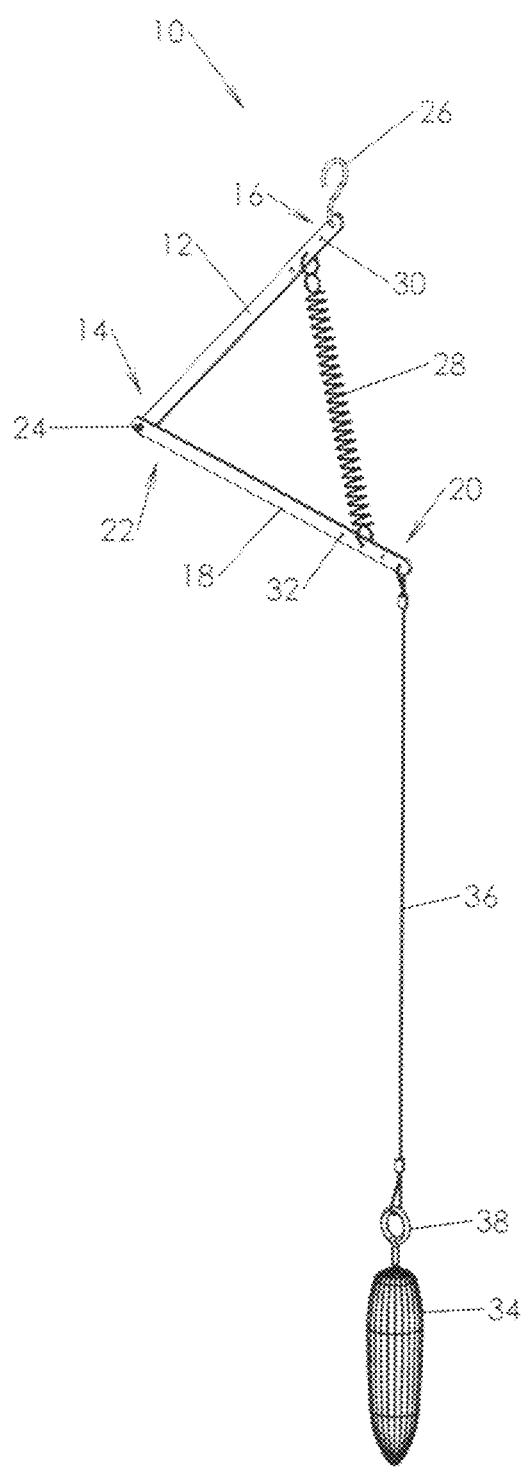
FIG. 1 is a side view of one embodiment of an apparatus according to the present invention.

Referring to the drawings in greater detail and by reference characters thereto, there is illustrated in FIG. 1 an embodiment of the apparatus and which embodiment is generally designated by reference numeral 10.

Apparatus 10 includes a first arm 12 which has a distal end 14 and a proximal end 16. As used herein, distal end 14 will refer to that end which is remote from the point of attachment of the apparatus. Conversely, the proximal end will refer to that end closest to the point of attachment of the apparatus to a fixed point.

Apparatus 10 also includes a second arm 18 which has a distal end generally designated by reference numeral 20 and a proximal end generally designated by reference numeral 22. First arm 12 and second arm 18 are secured together at pivot point 24; distal end 14 of first arm 12 is secured to proximal end 22 of second arm 18. The securement of the two arms together may be done in any known manner.

An S hook hanger 26 is utilized to hang the apparatus 10 from a suitable point. This could be either from a fixed structure such as a tree, balcony, or alternatively a stand such as is utilized for hanging bird feeders may be utilized.

At proximal end 16 of first leg 12 there are provided a series of apertures 30. Similarly, at the distal end 20 of second arm 18, there are provided a series of apertures 32. Extending between one of the apertures 30 and one of the apertures 32 is a coil spring 28. Thus the spring tension can be varied according to the aperture utilized.

Secured to distal end 20 of second arm 18 is a flexible cable 36. At the free end of cable 36, there is provided a play device 34 which is secured to cable 36 by hook 38. Cable 36 may be formed of any conventional material.

Figure 2:
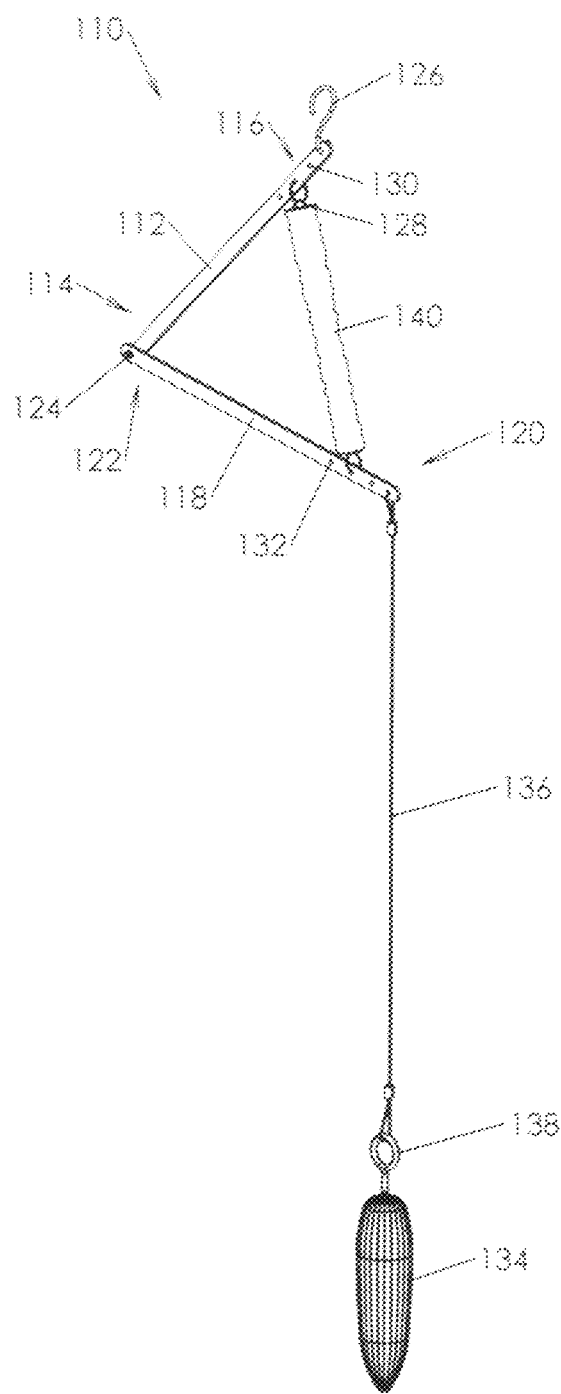
FIG. 2 is a side view similar to FIG. 1 illustrating a modified form of the apparatus.
Figure 3:
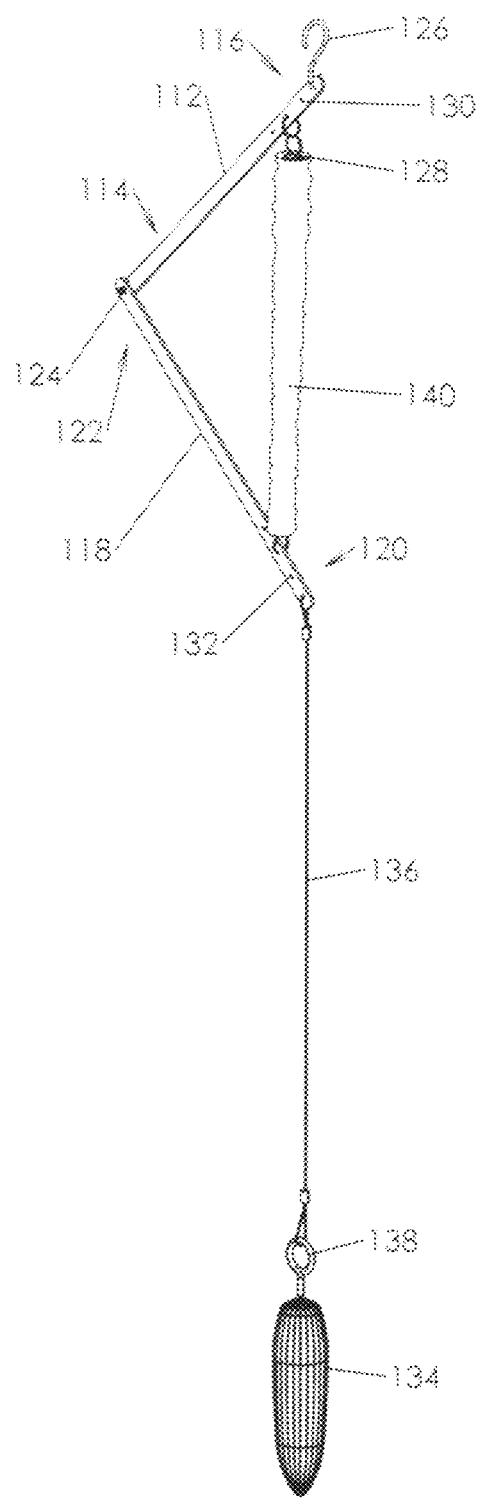
FIG. 3 is a side view of the apparatus of FIG. 2 when the spring is extended due to a weight being placed on the apparatus.

The embodiment of FIG. 2 is similar to that of FIG. 1 and similar reference numerals in the 100's are employed. Thus, apparatus 110 includes a first arm 112 having distal end 114 and proximal end 116. A second arm 118 has distal end 120 and proximal end 122 and is secured to first arm 112 at pivot point 124.

An S hook 126 is secured to proximal end 116 of first arm 112. Apertures 130 are provided at proximal end 116 of first arm 112 and apertures 132 are provided in second arm 118 at distal end 120. A Spring 128 interconnects proximal end 116 of first arm 112 and distal end 120 of second arm 118 as was the case in the previously described embodiment. However, in this embodiment, there is provided a sheet or cover 140 over spring 128 to prevent any injury. Cover 140 could, for example, be of a fabric material. The play device 134 has a hanger 138 secured thereto for attaching the play device to a flexible cable 136.

The arrangement is such that when an animal such as a squirrel or a chipmunk attempts to jump on play device 134 for feeding or the like, spring 128 will extend and cause play device 134 to move downwardly and sidewardly in an arc. This movement will be repeated as the spring expands and contracts thus raising and lowering the animal while at the same moving in an arc like movement.

It will be understood that the above described embodiment is for purposes of illustration only and that changes and modifications may be made thereto without departing from the spirit and scope of the invention.

I claim:

1. An apparatus comprising:
   a first arm having a first proximal end and a distal end;
   a second arm having a proximal end and a distal end;
   said distal end of said first arm being pivotally connected to said proximal end of said second arm;
   a spring member extending between said first and second arms, said spring member being attached to said first arm proximate said proximal end and attached to said second arm proximate said distal end;
   a hanger located at said proximal end of said first arm; and
   a play device, a flexible cable having a first end connected to said second arm proximate said distal end thereof and a second end of said cable being connected to said play device.

2. The apparatus of claim 1 wherein said first arm has a plurality of apertures formed therein at said proximal end.

3. The apparatus of claim 1 wherein said second arm has a plurality of apertures formed therein at said distal end.

4. The apparatus of claim 1 further including a cover for said spring member.

5. The apparatus of claim 1 wherein said play device comprises food.

6. The apparatus of claim 5 wherein said hanger comprises an S hook.

* * * * *